US010183815B2

(12) United States Patent
Hordijk et al.

(10) Patent No.: US 10,183,815 B2
(45) Date of Patent: Jan. 22, 2019

(54) EGG TRANSFER DEVICE

(71) Applicant: SANOVO TECHNOLOGY NETHERLANDS B.V., Aalten (NL)

(72) Inventors: Jan Hordijk, Aalten (NL); Edwin Lambertus Maria Papen, Vorden (NL)

(73) Assignee: SANOVO TECHNOLOGY NETHERLANDS B.V., Aalten (NL)

( * ) Notice: Subject to any disclaimer, the term of this patent is extended or adjusted under 35 U.S.C. 154(b) by 0 days.

(21) Appl. No.: 15/544,178

(22) PCT Filed: Jan. 13, 2016

(86) PCT No.: PCT/NL2016/050031
§ 371 (c)(1),
(2) Date: Jul. 17, 2017

(87) PCT Pub. No.: WO2016/118004
PCT Pub. Date: Jul. 28, 2016

(65) Prior Publication Data
US 2018/0265307 A1    Sep. 20, 2018

(30) Foreign Application Priority Data

Jan. 19, 2015 (NL) .................................... 2014158

(51) Int. Cl.
| | | |
|---|---|---|
| B65G 47/38 | (2006.01) | |
| B65G 23/06 | (2006.01) | |
| B65G 47/54 | (2006.01) | |
| B65B 23/06 | (2006.01) | |

(52) U.S. Cl.
CPC .............. B65G 47/54 (2013.01); B65B 23/06 (2013.01); B65G 47/38 (2013.01); B65G 2201/0208 (2013.01)

(58) Field of Classification Search
CPC ................... B65G 47/38; B65G 47/54; B65G 2201/0208; B65G 47/30; B65B 23/06
(Continued)

(56) References Cited

U.S. PATENT DOCUMENTS

| 3,238,694 A | * | 3/1966 | Bartlett | .................. B65B 23/06 |
| | | | | 198/416 |
| 3,820,301 A | * | 6/1974 | Wilsey | ................... B65B 23/02 |
| | | | | 198/399 |
| 3,894,631 A | * | 7/1975 | Rose | ...................... A01K 43/00 |
| | | | | 198/378 |

(Continued)

FOREIGN PATENT DOCUMENTS

| CN | 1496644 | 5/2004 |
| CN | 101772464 | 7/2010 |
| WO | WO-2013/006052 | 1/2013 |

OTHER PUBLICATIONS

International Search Report for PCT/NL2016/050031 dated Jun. 1, 2016.
(Continued)

*Primary Examiner* — James R Bidwell
(74) *Attorney, Agent, or Firm* — Nixon Peabody LLP; Jeffrey L. Costellia

(57) ABSTRACT

An egg conveyor assembly is provided herein. The egg conveyor assembly includes a first conveyor extending in a first conveyor direction on a first height level, a second conveyor extending in a second conveyor direction perpendicular to the first height level. A transfer device adapted to transfer eggs from the first to the second conveyor includes an array of egg retainers. The egg retainers include pockets having a receiving opening at an upper end thereof to receive the eggs from above from the first conveyor, and are adapted to release the eggs at a lower end to drop the eggs in egg retainers of the second conveyor. The transfer device is movable in the first conveyor direction and in the second (Continued)

conveyor direction in a plane on a height level between the first height level and second height level.

9 Claims, 6 Drawing Sheets

(58) Field of Classification Search
USPC .............................................. 198/418.6, 432
See application file for complete search history.

(56) References Cited

U.S. PATENT DOCUMENTS

| | | | | |
|---|---|---|---|---|
| 4,488,637 | A * | 12/1984 | Loeffler | B65B 23/08 |
| | | | | 198/803.9 |
| 4,505,373 | A * | 3/1985 | Thomas | B65B 23/08 |
| | | | | 177/145 |
| 4,603,772 | A * | 8/1986 | Tomosue | B65G 69/16 |
| | | | | 198/418.6 |
| 4,708,250 | A * | 11/1987 | van der Schoot | A01K 43/00 |
| | | | | 198/465.1 |
| 4,863,008 | A * | 9/1989 | Doi | B65B 23/06 |
| | | | | 198/378 |
| 5,232,080 | A | 8/1993 | van Essen et al. | |
| 2013/0199895 | A1* | 8/2013 | Wikkerink | B65B 23/06 |
| | | | | 198/577 |

OTHER PUBLICATIONS

Written Opinion for PCT/NL2016/050031 dated Jun. 1, 2016.
Chinese Office Action No. 201680006276.6 dated Oct. 9, 2018.

\* cited by examiner

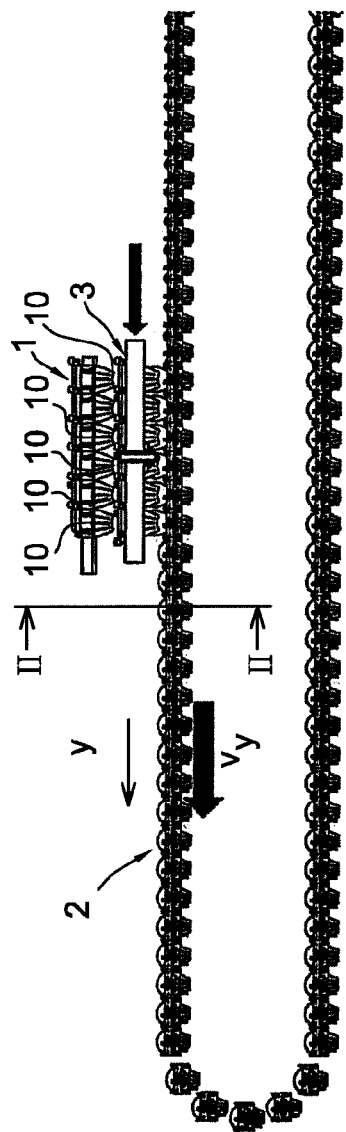
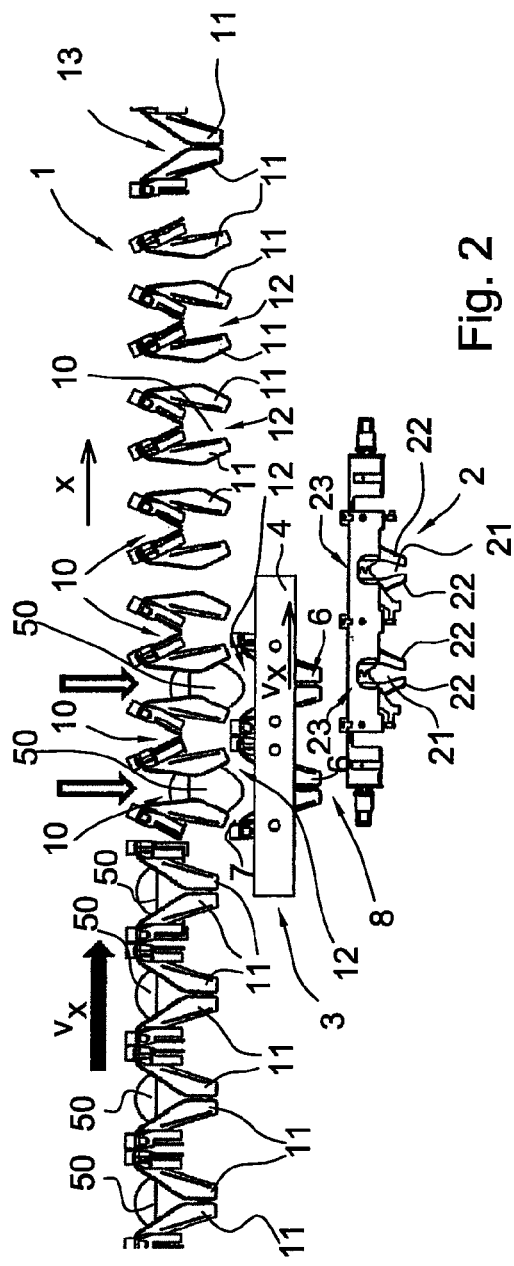

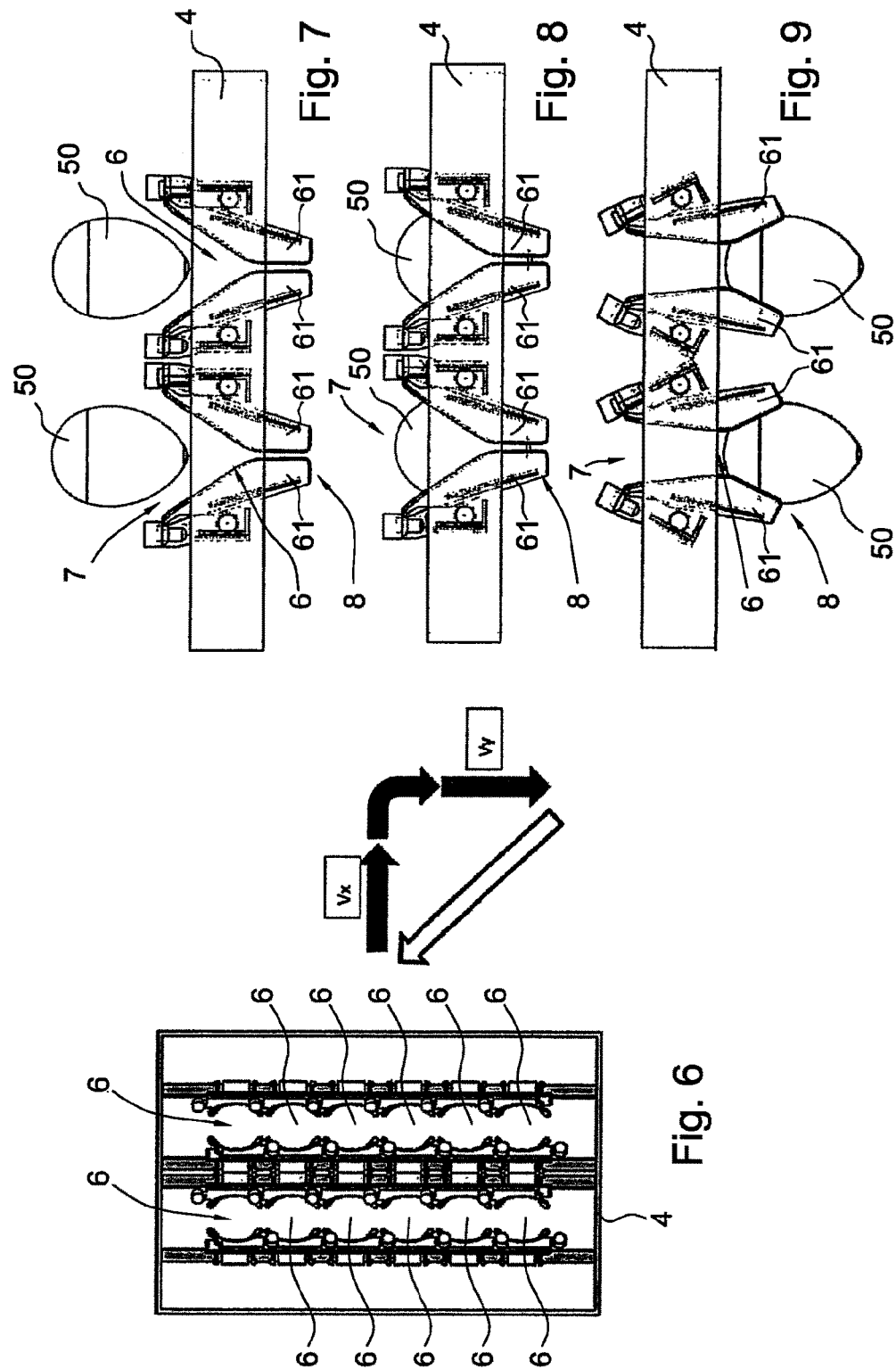

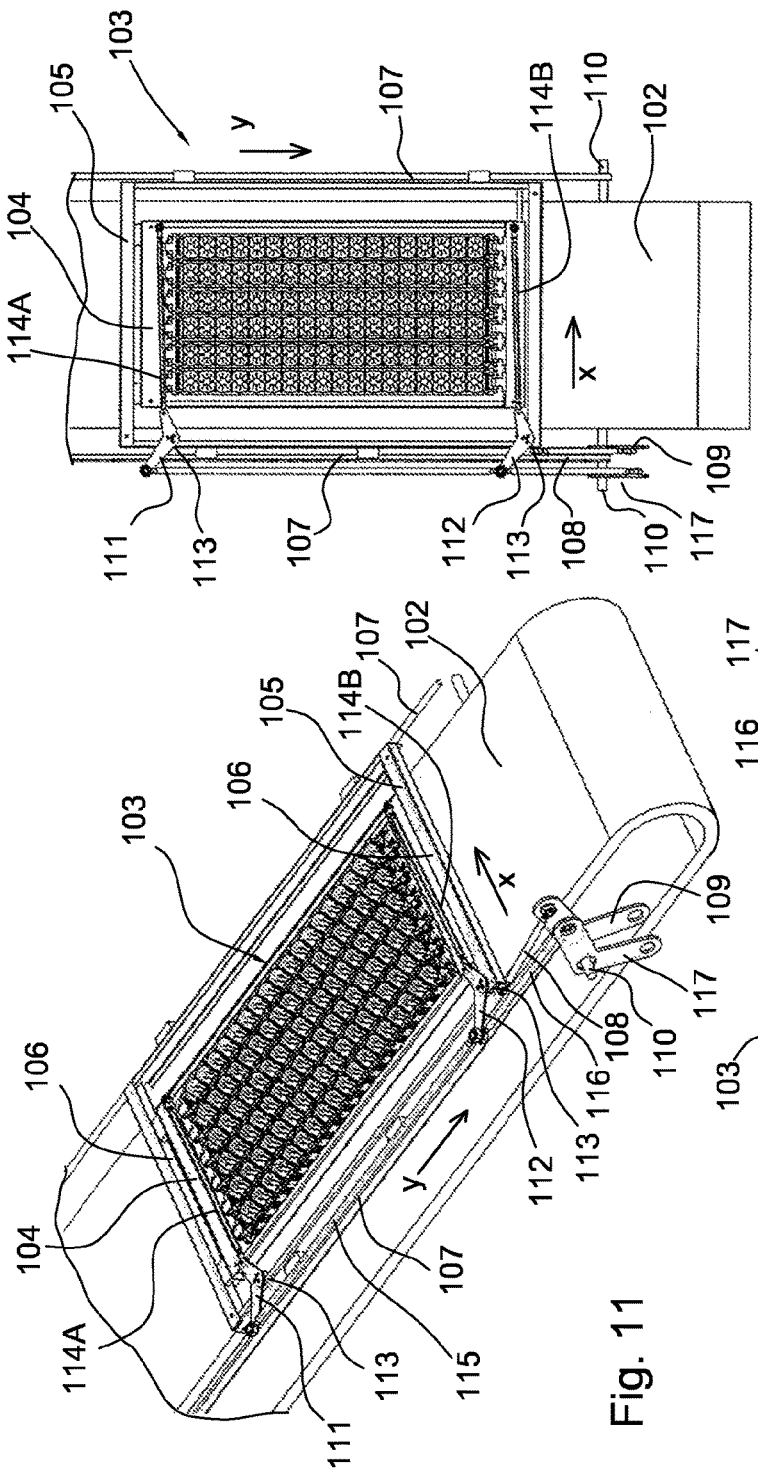
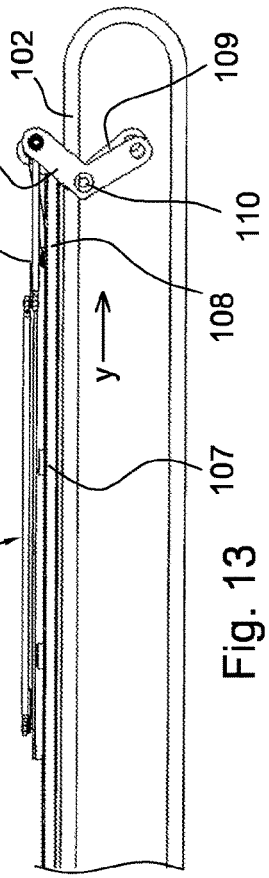
Fig. 11
Fig. 12
Fig. 13

EGG TRANSFER DEVICE

FIELD OF THE INVENTION

The present invention relates to an egg conveyor assembly comprising:
- a first (endless) conveyor comprising at least one lane of egg retainers that extends in a first conveyor direction (X) on a first height level,
- a second (endless) conveyor comprising at least one lane of egg retainers that extends in a second conveyor direction (Y) on a second height level, wherein the first conveyor direction (X) and second conveyor direction (Y) are substantially perpendicular, and
- a transfer device adapted to transfer eggs from the first conveyor to the second conveyor and comprising an array of egg retainers, said array having at least one row of egg retainers, wherein each row has a number of egg retainers that corresponds to the number of lanes of the first conveyor, and which array furthermore has a number of rows that corresponds to the number of lanes of the second conveyor.

BACKGROUND OF THE INVENTION

U.S. Pat. No. 3,894,631 discloses an egg conveyor assembly having a first endless conveyor with six lanes, wherein the eggs are oriented horizontally and supported on rollers and a second conveyor with one lane of egg retaining pockets for carrying the eggs oriented vertically. An egg transfer mechanism is provided at the discharge end of the first conveyor. The transfer mechanism comprises six egg transfer cups and receives the eggs in the horizontal orientation in said cups and drops the eggs in the retaining pockets of the second conveyor. The transfer mechanism is adapted to tilt the cups to a downwardly inclined position and is adapted to accelerate the egg transfer cups to a velocity that approximates the velocity of the second conveyor.

In EP 2 174 896 A1 a different egg conveyor assembly is disclosed. In this known assembly a first conveyor and a second conveyor cross each other, wherein the second conveyor is positioned below the first conveyor. The first conveyor has rows of retaining seats and the second conveyor has retaining seats for receiving eggs from above and retain them. The pitch between the retaining seats of the first conveyor in the crosswise direction can be changed. Subsequently the retaining seats of the first conveyor can be accelerated in the direction of movement of the second conveyor to synchronise their speed with the conveying speed of the second conveyor and the eggs are ejected from the retaining seats of the first conveyor directly into the retaining seats of the second conveyor. In this known egg conveyor assembly the retaining seats of the first conveyor retain a speed transverse to the direction of the second conveyor when the transfer of eggs takes place. This has the disadvantage that the eggs that are dropped from the seats of the first conveyor into the seats of the second conveyor have a relative horizontal speed component. If the speed of the first conveyor is increased the risk of damaging or loss of eggs is increased. This thus limits the speed of the first conveyor and consequently the capacity of the conveyor assembly.

The present invention has for an object to provide an alternative egg conveyor assembly.

SUMMARY OF THE INVENTION

This object is achieved by an egg conveyor assembly comprising:
- a first (endless) conveyor comprising at least one lane of egg retainers that extends in a first conveyor direction (X) on a first height level,
- a second (endless) conveyor comprising at least one lane of egg retainers that extends in a second conveyor direction (Y) on a second height level, wherein the first conveyor direction (X) and second conveyor direction (Y) are substantially perpendicular, and
- a transfer device adapted to transfer eggs from the first conveyor to the second conveyor and comprising an array of egg retainers, said array having at least one row of egg retainers, wherein each row has a number of egg retainers that corresponds to the number of lanes of the first conveyor, and which array furthermore has a number of rows that corresponds to the number of lanes of the second conveyor,
- wherein the first conveyor and second conveyor cross each other, wherein the first height level is above the second height level,
- the egg retainers of the transfer device comprise pockets having a receiving opening at an upper end thereof to receive the eggs from above from the first conveyor, and are adapted to release the eggs at a lower end to drop the eggs in the egg retainers of the second conveyor, and
- the transfer device is movable in the first conveyor direction (X) and in the second conveyor direction (Y) in a plane on a height level between the first height level and second height level.

With the configuration of the conveyor assembly according to the invention allows to achieve one or more of the following advantages:

The transfer device can be synchronised in speed with both the first conveyor and the second conveyor in the first conveyor direction (X) and in the second conveyor direction (Y) respectively, such that during the transfer of eggs from the first conveyor to the transfer device and from the transfer device to the second conveyor the relative speed between the egg discharging part and the egg receiving part is approximately zero. Thereby the speed of the first conveyor can be higher than with existing conveyor assemblies with a transfer between conveyors known from the prior art.

Furthermore, the configuration of the conveyor assembly according to the invention allows the use of gravity as the driving force for transferring the eggs from the first conveyor to the transfer device and from the transfer device to the second conveyor. For example no complex lifting structures have to be applied.

Moreover, due to the fact that the first conveyor and second conveyor cross each other at different height levels, there is less floor space necessary in the plant to transfer eggs from the one to the other conveyor.

Also the feature that the egg retainers of the transfer device comprise pockets in which the eggs are received from above and are released at a lower end is favourable in that these pockets firmly hold the eggs all around and allow the eggs to be accelerated and decelerated at a high rate, without the risk that the eggs are lost from the retainers or damaged. Thus a quickly moving transfer device can be provided, which results in that the possible speed and acceleration/deceleration that can be achieved by the transfer device does not form a too great limitation for the speed of the conveyors.

Also, because a separate transfer device is used between the first and second conveyor, relatively standard endless conveyors can be used as first and second conveyor which is economically favourable.

In a preferred embodiment the transfer device is adapted and arranged in such a way that the transfer device in a first stage of movement, in which the eggs are received from the first conveyor, moves in the first conveyor direction (X) with a velocity ($v_X$), preferably a constant velocity, synchronised with the first conveyor, and in a second stage of movement, in which the eggs are released to the second conveyor, moves in the second conveyor direction (Y) with a velocity ($v_Y$), preferably a constant velocity, synchronised with the second conveyor. The transfer device is thus advantageously moveable in the first conveyor direction X and in the second conveyor direction Y such that the eggs can be received by the transfer device from the first conveyor while its movement is synchronised with the movement of the first conveyor and such that the eggs can be discharged from the transfer device to the second device while the movement of the transfer device is synchronised with the movement of the second conveyor. Thus the risk of damaging the eggs during transfer from the first conveyor to the transfer device and subsequently from the transfer device to the second conveyor is greatly reduced, while advantageously the first conveyor and second conveyor can continuously move on (possibly at high speed) without intermittently stopping and accelerating again.

In a further embodiment the transfer device is adapted and arranged in such a way that, in an intermediate stage between the first and second stages of movement, the transfer device is decelerated in the first direction (X) from a velocity ($v_X$) of the first conveyor to a velocity of preferably 0 m/s and is, preferably simultaneously, accelerated in the second direction from preferably a velocity of 0 m/s to the velocity ($v_Y$) of the second conveyor.

In a possible embodiment the egg retainers of the first conveyor has egg retaining pockets adapted to release the eggs at a lower end to drop the eggs in the egg retainers of the transfer device. Egg retaining pockets of this type are as such known and are proven technology, which is advantageous to apply.

In a possible embodiment the egg retainers of the second conveyor comprise pockets having a receiving opening at an upper end thereof to receive the eggs from above. The pocket type retainers hold the eggs in an upright position, thereby providing a high capacity per length unit. Furthermore the pocket type egg retainers allow a fast conveying speed without the danger of losing or damaging the eggs. Thus the overall capacity of the conveyor assembly can be maintained high.

In a possible embodiment the assembly comprises one transfer device.

In another possible embodiment the assembly comprises at least two transfer devices, which are arranged such that when one of the at least two transfer devices is transferring eggs from the first conveyor to the second conveyor, another one of the at least two transfer devices is in a return stage in which it moves back to the initial position at the first conveyor.

In a possible embodiment the first conveyor and second conveyor each have a drive mechanism comprising a drive motor, wherein the transfer device is coupled through a cam mechanism with the drive mechanism of the first conveyor or the second conveyor to drive the movement of the transfer device. The advantage of this is that the conveyors and the transfer can be mechanically coupled and mechanically synchronised, which provides a robust synchronising system which will not fail easily.

In a particularly practical embodiment the transfer device comprises an outer carrying frame and an inner carrying frame, the array of egg retainers being supported in the inner carrying frame, the inner carrying frame being moveable along a first guide that is provided on the outer carrier frame, and the outer carrying frame being supported by a fixed second guide, wherein the first guide and the second guide extend substantially perpendicular. Preferably the first guide extends parallel to the first conveyor direction (X) and the second guide extends parallel to the second conveyor direction (Y).

In a possible embodiment the array of egg retainers is removable from the assembly. This allows the array of egg retainers to be disassembled from the assembly which facilitates for example cleaning them or preforming regular maintenance.

The invention will be elucidated in the following detailed description with reference to the drawing.

BRIEF DESCRIPTION OF THE DRAWINGS

FIG. 1 shows schematically a side view of a possible embodiment of a conveyor assembly according to the invention;

FIG. 2 shows a front view from the line II-II as indicated in FIG. 1;

FIG. 6 shows a top elevational view of the transfer device of FIG. 4 together with an indication of velocity vectors applied during use;

FIG. 7 shows a side elevational view of the transfer device of FIG. 4 while receiving eggs from above;

FIG. 8 shows a side elevational view of the transfer device of FIG. 4 while holding the eggs;

FIG. 9 shows a side elevational view of the transfer device of FIG. 4 while releasing the eggs at an underside;

FIG. 11 shows a view in perspective of a second conveyor and a transfer device of another possible embodiment of a conveyor assembly according to the invention;

FIG. 12 shows a top elevational view of the second conveyor and transfer device of FIG. 11; and FIG. 13 shows a side elevational view of the second conveyor and transfer device of FIG. 11.

DETAILED DESCRIPTION

Figure 3:
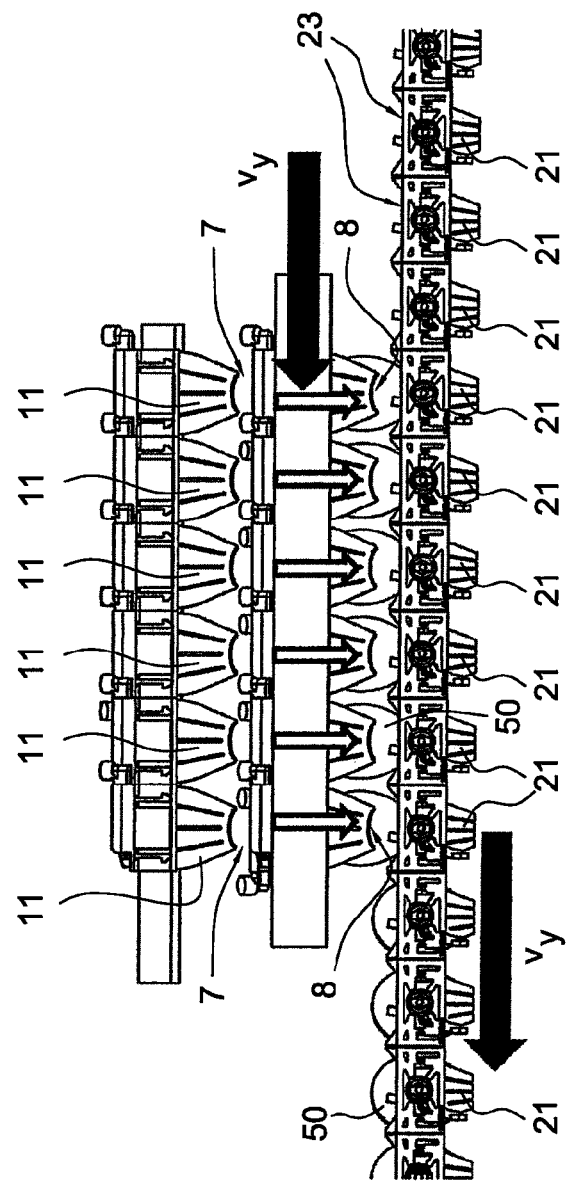
FIG. 3 shows a detailed side view of the conveyor assembly of FIG. 1 at the location of the transfer mechanism.

FIGS. 1-3 show a conveyor assembly comprising a first endless conveyor 1 which extends at a first height level and a second endless conveyor 2 which extends at a second height level below the first height level. The first conveyor 1 extends in a first direction X and the second conveyor extends in a second direction Y, which is substantially perpendicular to the first direction X. The first conveyor 1 and the second conveyor 2 cross each other. Because the first conveyor 1 and second conveyor 2 cross each other at different height levels, floor space in the plant is used more efficiently. Moreover gravity can be conveniently used to transfer the eggs from the first conveyor 1 to the second conveyor 2.

The first endless conveyor 1 comprises a number of lanes of egg retainers. In the embodiment shown in FIG. 1-3 by way of example, the first conveyor 1 has six lanes of egg retainers. The egg retainers of the first conveyor 1 are configured as egg retaining pockets 10 adapted to release the eggs at a lower end 12 to drop the eggs in egg retaining pockets 6 of a transfer device 3 as is illustrated in FIG. 2. The egg retaining pockets 10 of the first conveyor 1 have a receiving opening 13 to receive the eggs 50 from above. The egg retaining pockets 10 have pivotable pocket fingers 11 which are adapted to pivot between a holding position (cf. FIG. 2 at the left) and a release position spaced apart from each other (cf. FIG. 2 in the middle) to create a passage at the lower end to release the eggs 50 at said lower end of the pockets 10.

The second endless conveyor 2 comprises a number of egg retainers. In the embodiment shown the second conveyor 2 has two lanes of egg retainers. The egg retainers of the second conveyor 2 are configured as egg retaining pockets 21 having a receiving opening 23 at an upper end thereof to receive the eggs from above. The egg retaining pockets 21 have pivotable pocket fingers 22 which are adapted to pivot between a holding position (cf. FIG. 2) and a release position spaced apart from each other (not shown) to create a passage at the lower end to release the eggs 50 at said lower end of the pockets 21 into for example another egg handling station or into an egg package or tray.

Figure 4:
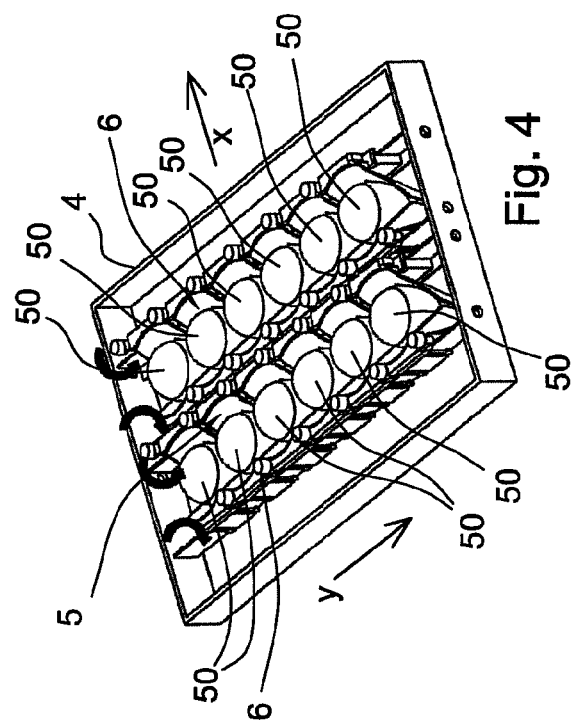
FIG. 4 shows a view in perspective of a part of a transfer device of the conveyor assembly of FIG. 1.

Positioned in a plane on a height level between the first height level and second height level is a transfer device 3. The transfer device 3 comprises a frame 4 in which an array 5 of pockets 6 is arranged as is shown in FIG. 4. In the embodiment shown, the array comprises two rows of each six pockets 6.

Figure 5:
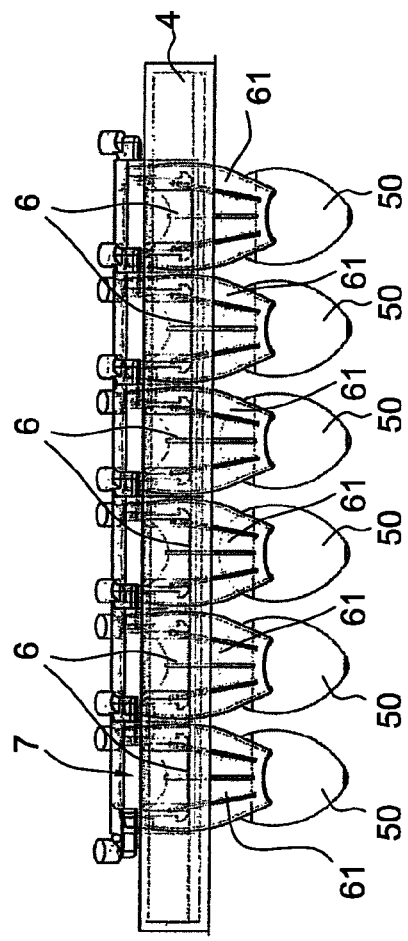
FIG. 5 shows a front view of the transfer device of FIG. 4.

In FIGS. 7-9 is shown the transfer device 3 during receiving the eggs 50 (FIG. 7), during retaining the eggs 50 (FIG. 8) and during releasing the eggs 50 (FIG. 9). Also in FIG. 5 is shown the transfer device 3 during releasing the eggs 50, but from a different view. The pockets 6 of the transfer device have a receiving opening 7 at an upper end thereof to receive the eggs 50 from above from the first conveyor 1, as is also illustrated in FIG. 2. The pockets 6 have pivotable pocket fingers 61, similar to the pockets of the first conveyor, which are adapted to pivot away from each other (cf. FIG. 9) to release the eggs 50 at a lower end 8 to drop the eggs 50 in the egg retainers 21 of the second conveyor 2, as is also illustrated in FIG. 3.

The respective falling heights of the eggs 50 from the pockets 10 of the first conveyor 1 in the pockets 6 of the transfer device 3 and from the pockets 6 of the transfer device 3 in the pockets 21 of the second conveyor 2 in a practical embodiment may range of 80 mm-120 mm, more in particular about 100 mm.

The transfer device 3 is movable in the first conveyor direction X and in the second conveyor direction Y in a plane on the mentioned height level between the first height level and second height level. The array 5 of pockets 6 and the frame 4 of the transfer device 3 can move in such a way that the transfer device 3 in a first stage of movement, in which the eggs 50 are received from the first conveyor (cf. FIG. 2), moves in the first conveyor direction X with a constant velocity $v_X$ synchronised with the first conveyor 1. In a second stage of movement, in which the eggs are released to the second conveyor 2 (cf. FIG. 3), the transfer device moves in the second conveyor direction Y with a constant velocity $v_Y$ synchronised with the second conveyor 2. The transfer device 3, in an intermediate stage between the first and second stages of movement, is decelerated in the first direction X from a velocity $v_X$ of the first conveyor to a velocity of 0 m/s and is simultaneously accelerated in the second direction from a velocity of 0 m/s to the velocity $v_Y$ of the second conveyor. This is illustrated in FIG. 6 on the right where the velocity vectors are indicated.

Figure 10:
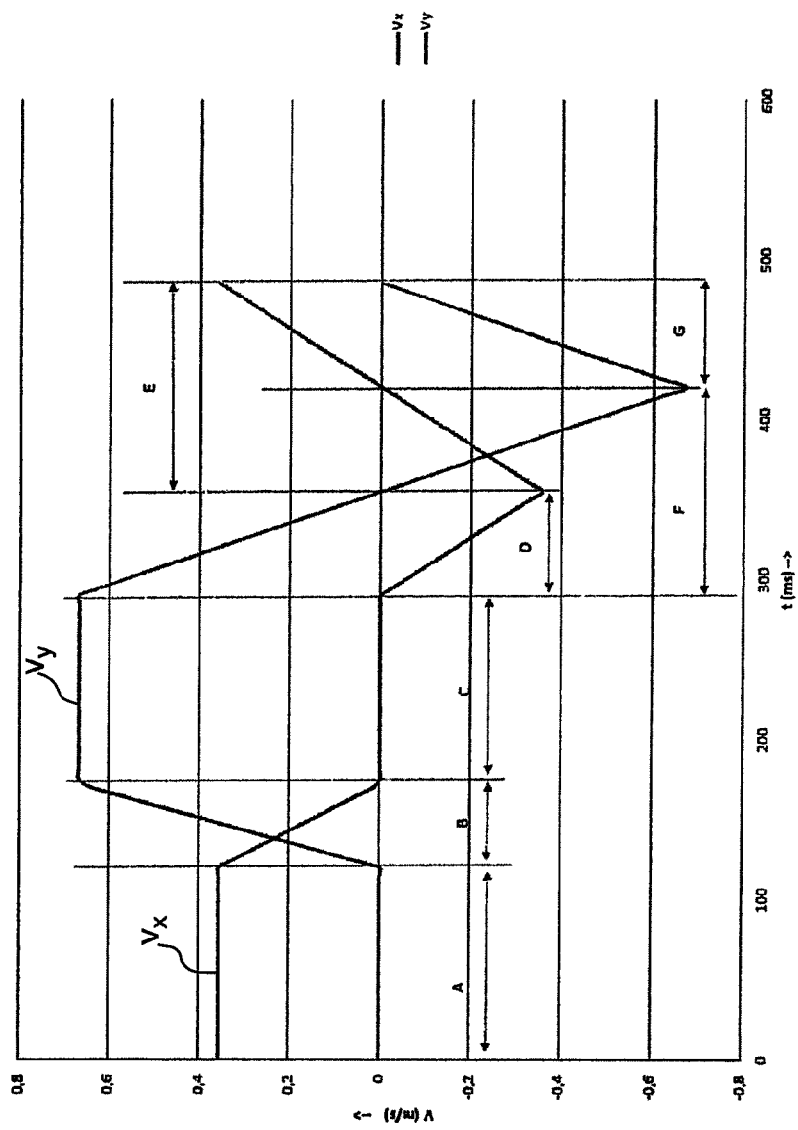
FIG. 10 shows a diagram in which the velocities of the transfer device in use in X and Y direction are plotted against time.

Also in FIG. 10 is shown a plot of the velocities $v_X$ and $v_Y$ of the transfer device 3 against time. It is noted that the indicated durations and velocities in FIG. 10 are given as an example, and is not to be considered as limiting or essential.

In a stage A (duration about 120 ms) the velocity $v_X$ is constant and synchronised with the velocity of the first conveyor 1. At the same time the velocity $v_Y$ is 0 m/s. During this stage A the eggs 50 are dropped from the pockets 11 of the first conveyor 1 in the pockets 6 of the transfer device 3.

In a stage B (duration about 55 ms) the transfer device 3 is accelerated in the Y-direction and simultaneously decelerated in the X direction. Both the acceleration and deceleration are constant.

In a stage C (duration about 112 ms) the velocity $v_X$ is 0 m/s and the velocity $v_Y$ is constant and synchronised with the velocity of the second conveyor 2. During this stage C the eggs 50 are dropped from the pockets 6 from the transfer device 3 in the pockets 21 of the second conveyor 2.

In a stage D (duration about 64 ms) the velocity $v_Y$ is decelerated to 0 m/s. simultaneously the transfer device 3 is accelerated in a direction opposite to the direction of movement of the first conveyor 1.

In a stage E (duration about 130 ms) the transfer device 3 is in X-direction first decelerated to a velocity $v_X$ of 0 m/s and then accelerated in the direction of movement of the first conveyor 1 until it is synchronised with the velocity of the first conveyor 1. At the same time the velocity $v_Y$ is first increased with constant acceleration in the direction opposite to the direction of movement of the second conveyor 2. Then (stage G) the velocity $v_Y$ of the transfer device 3 is decreased to 0 m/s. The transfer device 3 is now at the initial point of the movement at the beginning of stage A. Thus, in the example given, the total cycle of the transfer device takes about 0.5 second.

In FIG. 11-13 is disclosed an example of how the transfer device can be suspended and moved in the direction X and Y. In the embodiment illustrated the transfer device is indicated by reference numeral 103 and has an array of egg retaining pockets corresponding to a first conveyor (not shown in the FIGS. 11-13) having eighteen lanes and a second conveyor 102, schematically drawn having six lanes. A skilled person will understand that what is mentioned about the transfer device 3 in the above is also applicable to the transfer device 103 and, vice versa, what is mentioned here about the transfer device 103 is also applicable to the transfer device 3.

The transfer device 103 comprises an outer carrying frame 105 and an inner carrying frame 104. The array of egg retainers is carried by the inner carrying frame 104. The inner carrying frame 104 is moveable along a first guide 106 that is provided on the outer carrier frame 105. The outer carrying frame 105 is supported by a fixed second guide 107. The first guide 106 and the second guide 107 extend substantially perpendicular. The first guide 106 extends parallel to the first conveyor direction X. The second guide 107 extends parallel to the second conveyor direction Y.

The outer carrying frame 105 is connected through a push/pull rod 108 and a pivoting lever arm 109 to a drive mechanism to drive the movement of the outer carrying frame 105 along the second guide 107. When the lever arm 109 rotates clockwise around a horizontal shaft 110 in FIG. 13 the outer carrying frame 105 is pulled to the right in FIG.

13; when the lever arm rotates anti-clockwise in FIG. 13, the outer carrying frame 105 is pushed to the left in FIG. 13.

The inner carrying frame 104 is connected by two rods 114A and 114E with respective lever arms 111 and 112 which can rotate around a vertical rotation axis 113. At the other end of the lever arms 111, 112 they are interconnected by a push/pull rod 115. A further push/pull rod 116 is provided and connected to a pivoting lever arm 117, which pivots around the horizontal shaft 110, and the lever arm 112. Through this rod and lever mechanism the inner carrying frame 104 is connected with a drive mechanism to drive its movement.

In a particular preferred embodiment the described respective rod and lever mechanisms associated with the inner and outer carrying frames 104, 105 are connected with a drive mechanism of the first and/or second conveyor which comprises at least a drive motor. The advantage is that in this way the movement of the transfer device can be mechanically geared to the movement of one or both of the conveyors 1, 2. The transfer device may for example be coupled through a cam mechanism with the drive mechanism of the first conveyor or the second conveyor to drive the movement of the transfer device.

The invention claimed is:

1. An egg conveyor assembly comprising:
    a first conveyor comprising at least one lane of egg retainers that extends in a first conveyor direction (X) on a first height level,
    a second conveyor comprising at least one lane of egg retainers that extends in a second conveyor direction (Y) on a second height level, wherein the first conveyor direction (X) and second conveyor direction (Y) are substantially perpendicular, and
    a transfer device adapted to transfer eggs from the first conveyor to the second conveyor and comprising an array of egg retainers, said array having at least one row of egg retainers, wherein each row has a number of egg retainers that corresponds to the number of lanes of the first conveyor, and which array furthermore has a number of rows that corresponds to the number of lanes of the second conveyor,
    wherein
    the first conveyor and second conveyor cross each other, wherein the first height level is above the second height level,
    the egg retainers of the transfer device comprise pockets having a receiving opening at an upper end thereof to receive the eggs from above from the first conveyor, and are adapted to release the eggs at a lower end to drop the eggs in the egg retainers of the second conveyor, and
    the transfer device is movable in the first conveyor direction (X) and in the second conveyor direction (Y) in a plane on a height level between the first height level and second height level.

2. The egg conveyor assembly according to claim 1, wherein the transfer device is adapted and arranged in such a way that the transfer device in a first stage of movement, in which the eggs are received from the first conveyor, moves in the first conveyor direction (X) with a velocity ($v_X$) synchronised with the first conveyor, and in a second stage of movement, in which the eggs are released to the second conveyor, moves in the second conveyor direction (Y) with a velocity ($v_Y$) synchronised with the second conveyor.

3. The egg conveyor device according to claim 2, wherein the transfer device is adapted and arranged in such a way that, in an intermediate stage between the first and second stages of movement, the transfer device is decelerated in the first direction (X) from a velocity ($v_X$) of the first conveyor to a velocity of preferably 0 m/s and is accelerated in the second direction from preferably a velocity of 0 m/s to the velocity ($v_Y$) of the second conveyor.

4. The egg conveyor assembly according to claim 1, wherein the egg retainers of the first conveyor has egg retaining pockets adapted to release the eggs at a lower end to drop the eggs in the egg retainers of the transfer device.

5. The egg conveyor assembly according to claim 1, wherein the egg retainers of the second conveyor comprise pockets having a receiving opening at an upper end thereof to receive the eggs from above.

6. The egg conveyor assembly according to claim 1, wherein the assembly comprises one transfer device.

7. The egg conveyor assembly according to claim 1, wherein the transfer device comprises an outer carrying frame and an inner carrying frame, the array of egg retainers being supported in the inner carrying frame, the inner carrying frame being moveable along a first guide that is provided on the outer carrier frame, and the outer carrying frame being supported by a fixed second guide, wherein the first guide and the second guide extend substantially perpendicular.

8. The egg conveyor assembly according to claim 7, wherein the first guide extends parallel to the first conveyor direction (X) and the second guide extends parallel to the second conveyor direction (Y).

9. The egg conveyor assembly according to claim 8, wherein the array of egg retainers is removable from the assembly so as to allow cleaning.

* * * * *